Figure 1:
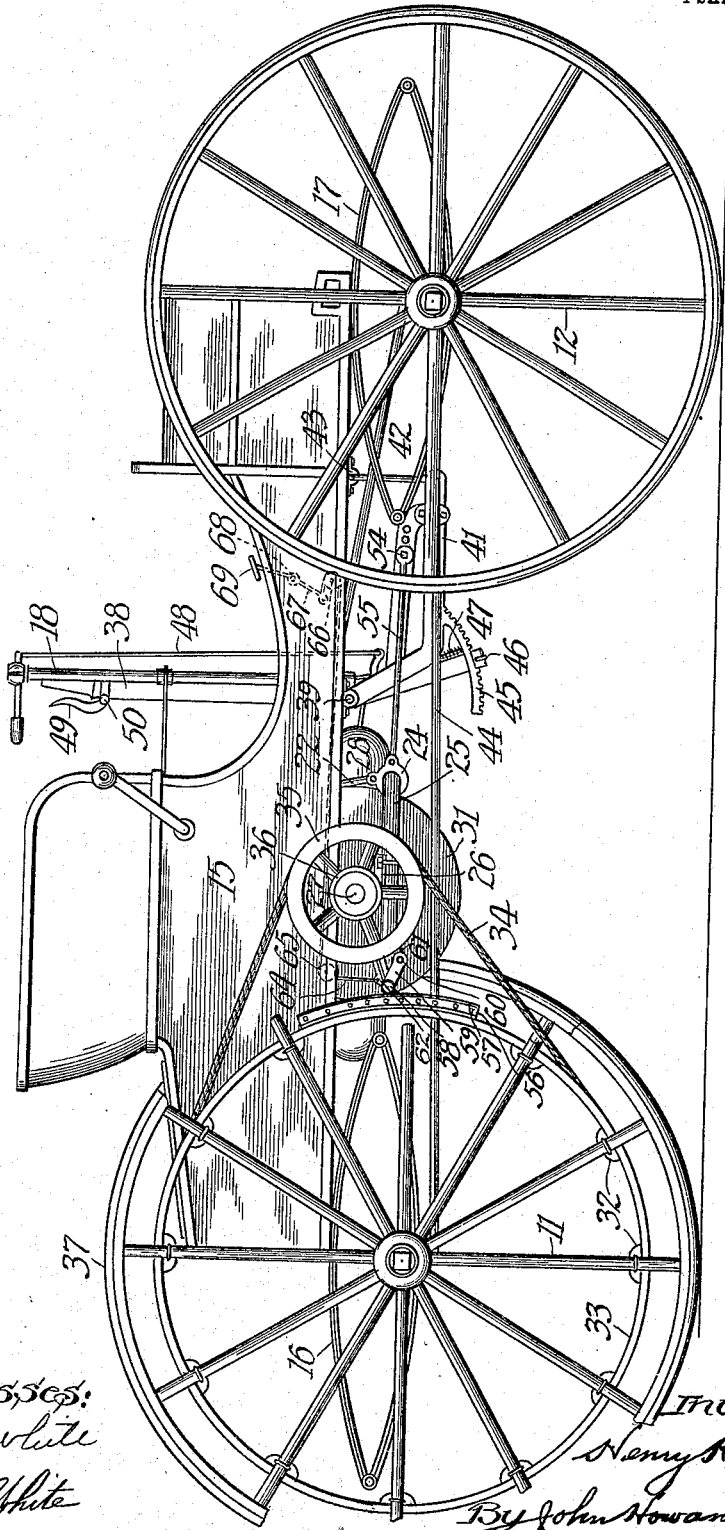

H. K. HOLSMAN.
BRAKING MECHANISM FOR AUTOMOBILES.
APPLICATION FILED FEB. 1, 1909.

937,212.

Patented Oct. 19, 1909.
4 SHEETS—SHEET 1.

H. K. HOLSMAN.
BRAKING MECHANISM FOR AUTOMOBILES.
APPLICATION FILED FEB. 1, 1909.

937,212.

Patented Oct. 19, 1909.
4 SHEETS—SHEET 2.

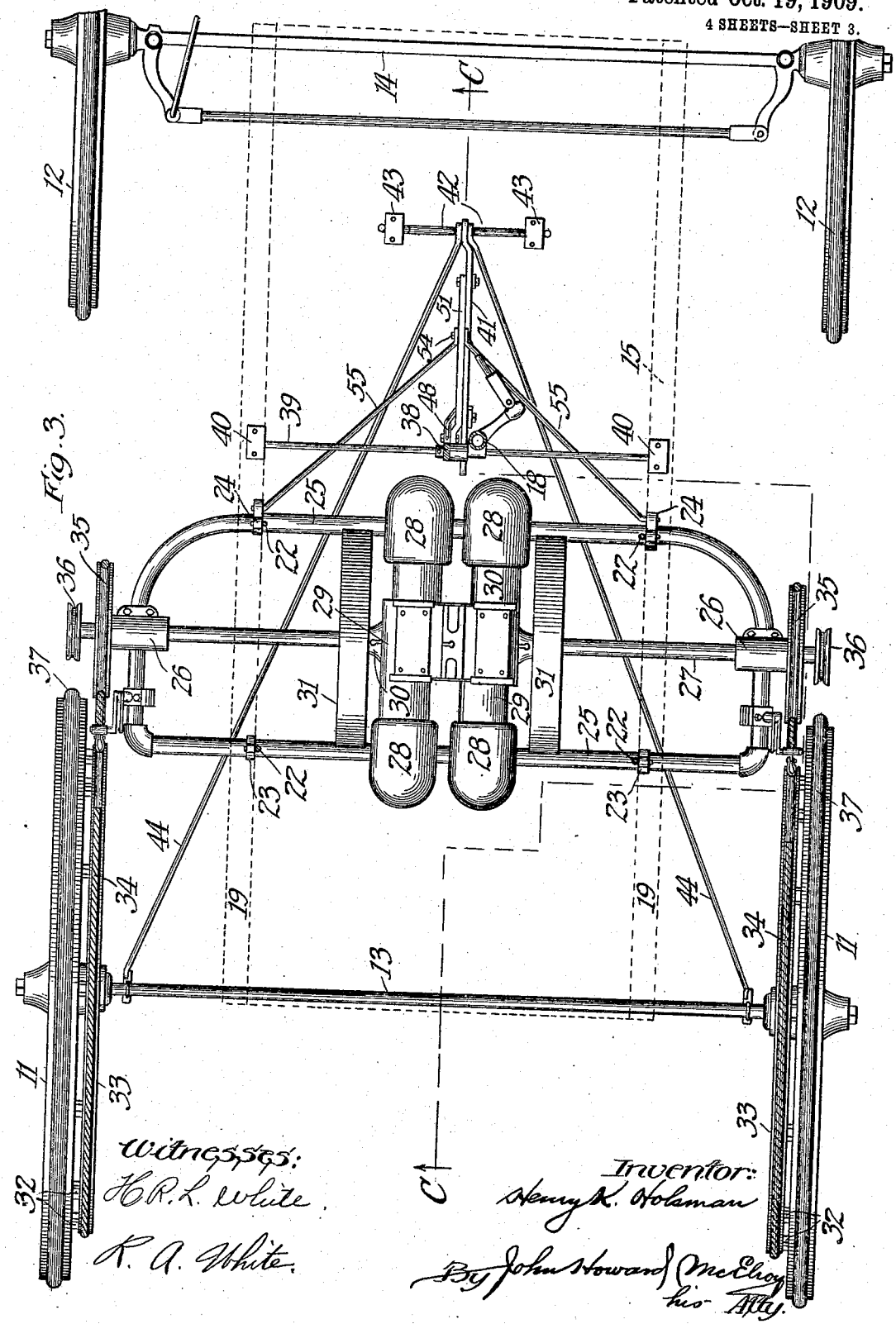

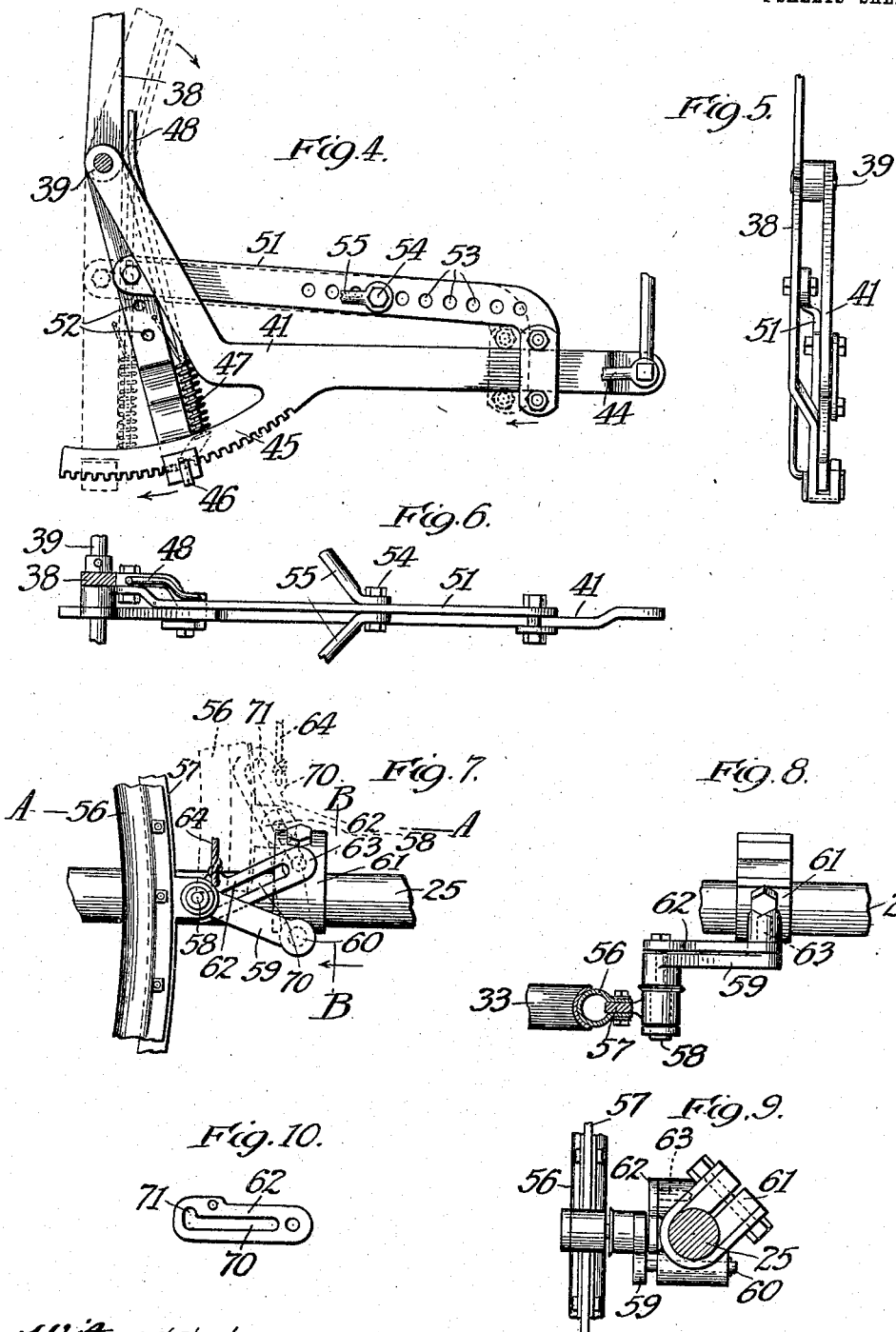

UNITED STATES PATENT OFFICE.

HENRY K. HOLSMAN, OF CHICAGO, ILLINOIS.

BRAKING MECHANISM FOR AUTOMOBILES.

937,212.          Specification of Letters Patent.     Patented Oct. 19, 1909.

Original application filed January 18, 1907, Serial No. 352,848. Divided and this application filed February 1, 1909. Serial No. 475,341.

*To all whom it may concern:*

Be it known that I, HENRY K. HOLSMAN, a citizen of the United States, and a resident of Chicago, in the county of Cook and State of Illinois, have invented certain new and useful Improvements in Braking Mechanism for Automobiles, of which the following is a full, clear, and exact specification.

The invention of my present application, which is a division of my prior application No. 352,848, filed January 18, 1907, for automobiles, is concerned with certain novel combinations of elements in automobiles, including a brake, as will be described.

To illustrate my invention, I annex hereto four sheets of drawings, in which the same reference characters are used to designate identical parts in all the figures, of which,—

Figure 2:
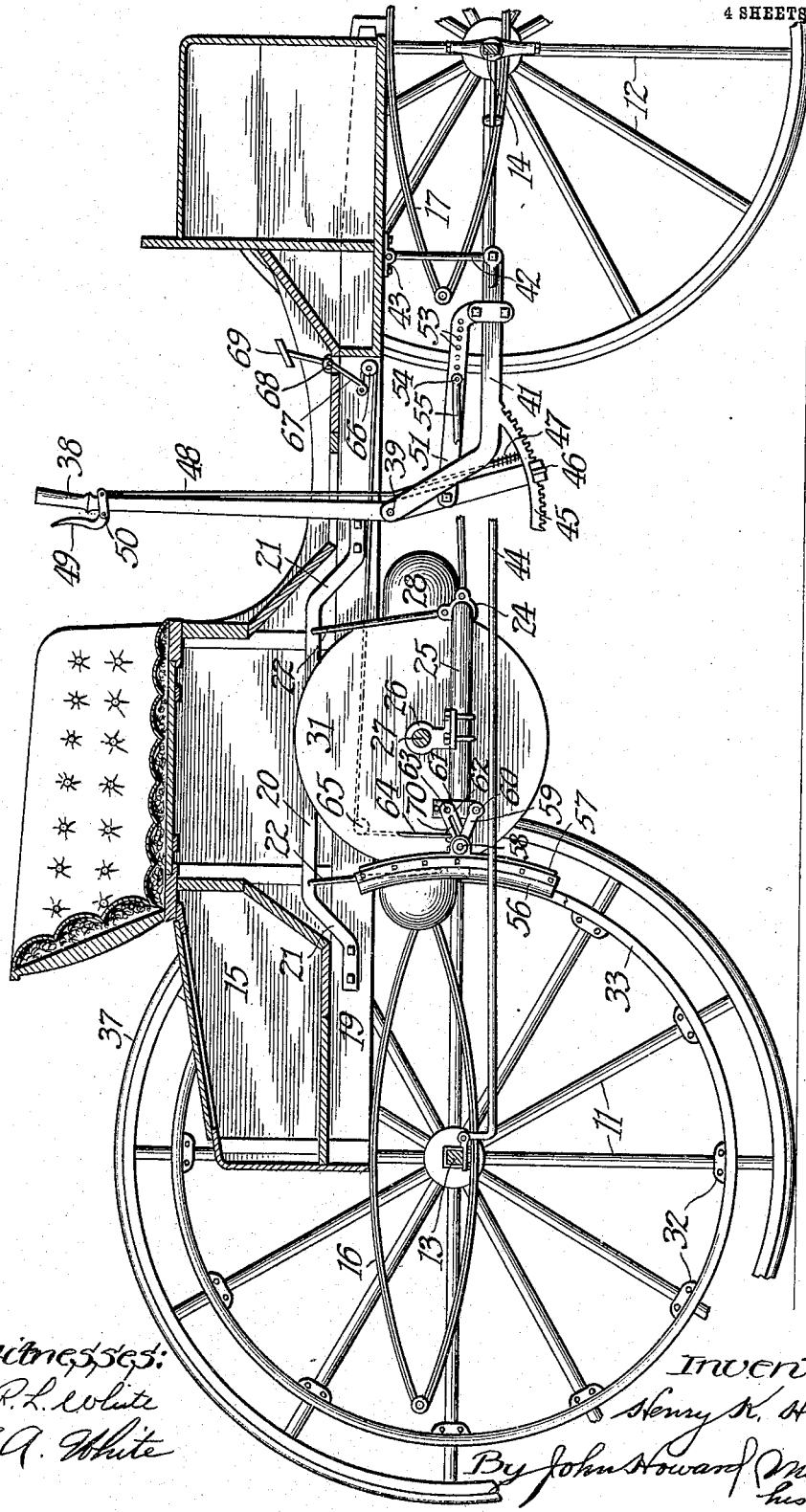

Figure 1 is a side elevation of an automobile containing my invention, with a portion of the rim of one of the driving wheels broken away; Fig. 2 is a central longitudinal section on a slightly enlarged scale; Fig. 3 is a top plan view of the running gears and the engine, with the carriage box or body removed; Fig. 4 is an enlarged detail in side elevation, showing the locking mechanism for holding the engine in any of its positions of adjustment; Fig. 5 is an end elevation of the mechanism shown in Fig. 4; Fig. 6 is a top plan view of the same mechanism; Fig. 7 is an enlarged detail, in side elevation, of a portion of the brake mechanism; Fig. 8 is a top plan view in section on the line A—A of Fig. 7; Fig. 9 is an end elevation of the brake mechanism, in section on the line B—B of Fig. 7; and Fig. 10 is a detail of the lifting and locking link of the brake mechanism.

As the braking mechanism is directly connected to and movable with the driving mechanism, in order to understand the complete combination covered by some of the claims, it is necessary to describe the automobile and its driving mechanism in some detail, which I will first proceed to do, and then describe the structure and relationship of the brake to the driving mechanism.

I have shown my invention as applied to an automobile of the buggy type, in which the traction wheels 11 and the steering wheels 12 are mounted upon the axles 13 and 14. The rear end of the box or bed 15 of the vehicle is supported on the axle 13 by means of the interposed springs 16, and its front end is supported on the axle 14 by means of the interposed springs 17. The steering wheels 12 have their bearings pivotally mounted on the axle bar 14, and are provided with any suitable steering connections leading to the steering post 18. The present application is not concerned with the steering mechanism, and consequently no further reference will be made thereto, it being fully described and claimed in my Patent No. 897,368, granted September 1, 1908.

The box or bed 15 is provided with the side bars 19, to which are rigidly secured, on the inner sides thereof, the engine supporting bars or beams 20, which are preferably inclined upward at the portions 21, as shown, to secure the proper elevation for the upper ends of the supporting links 22 pivoted therein. The lower ends of these links 22 are pivotally secured in the collars 23 and 24, which are secured upon the rear and front sides, respectively, of the generally rectangular-shaped engine-supporting frame 25, which, as best shown in Fig. 3, is made up of tubing properly bent and jointed. This frame has the bearings 26 for the ends of the engine shaft 27, secured upon the upper side of its ends, and the cylinders 28 of the engine rest thereon, and are preferably secured thereto in any desired manner. I preferably employ a four-cylinder engine of the opposed type, in which each pair of opposed engines is provided with a common crank box 29 and bearings 30 for the shaft 27. The fly wheels 31 are preferably secured to the shaft immediately adjacent the outer bearings 30, the engine proper being entirely beneath and protected by the body of the vehicle.

The traction wheels 11 have secured thereon by any suitable means, such as the clips 32, the pulley rim 33, which is adapted to receive the pulley ropes 34, which also run over the driving pulley wheels 35, which are, of course, of smaller diameter, and are secured on the shaft 27 just outside of the bearings 26. When the engine is moved into its forward position, shown in Fig. 2, the driving ropes 34 are tautened so that the rotation of the engine shaft 27 in a forward direction drives the vehicle forward. When it is swung back to the other extreme position, the grooved reversing disks 36 secured on the outer ends of the engine shaft 27 engage the tires 37 of the traction wheels 11, and serve to reverse the direction of movement of the vehicle at a much slower rate, by direct frictional contact. When the engine is in an intermediate position, the driving ropes 34 are not sufficiently taut to drive the vehicle, and the shaft 27 rotates idly.

To adjust and secure the engine shaft in any of these three positions, I employ the operating lever 38, which is preferably rigidly secured to the rock shaft 39 extending transversely across the machine between the bars 19 and journaled in the bearings 40 secured on the under sides thereof, as best seen in Fig. 3, although it will be understood that the shaft 39 may be merely a bearing rod secured in the bearings 40 with the lever 38 pivoted thereon. A segment supporting bar 41, best shown in Fig. 4, has its upper end loosely mounted on the rock shaft 39, and its forward end is mounted at a lower level upon the preferably V-shaped link rod 42, the extended upper end of which is journaled in the bearings 43 secured on the bottom of the box, as shown in Figs. 2 and 3. The distance rods 44 extend from the rear axle 13 diagonally to the lower end of the link 42, to which they are secured. As the link rod 42 is pivoted, and the long rod or shaft 39 can spring at its center backward or forward by these connections, I have a sufficiently flexible connection and support for the moving parts connected both to the running gears proper and the bed or body, which is yieldingly supported thereon through the medium of the springs 16 and 17, to accommodate the very considerable up and down, the lesser sidewise, and the still less horizontal movement of the body relative to the running gears.

The bar 41 has formed on the under side thereof the toothed segment 45, the teeth of which are adapted to be engaged by the detent 46 normally held yieldingly in engagement therewith by the helically-coiled contractile-spring 47 surrounding the lower portion thereof and having its other end secured upon the lower end of the lever 38, thus locking the lever and making a rigid connection of the engine and axle, while leaving the axle and body flexible relative to each other. The link 48, to the lower end of which the detent 46 is secured, extends upward adjacent the handle 38 to the thumb lever 49 pivoted to the handle 38 at 50, so that as the lever 49 is moved toward the handle 38, the link 48 is thrust downward to release the detent 46 from the teeth of the segment 45, so that the lever can be swung to any desired position, in which it will be held by the detent as soon as the pressure is released from the handle 49. For link connections between the engine frame and the lever 38, I preferably pivotally secure to the lower arm of the latter the link bar 51, and I preferably provide a plurality of apertures 52 in the lower arm of the lever 38 in order to adjust the link bar 51 as may be necessary. The link bar 51, instead of being directly connected to the engine frame, is also preferably provided with a plurality of apertures 53, through which a bolt 54 is passed to secure the diagonal link rods 55 thereto, the other ends of which are secured in bearings formed on the collars 24, so that as the lever 38 is swung, the engine is moved backward or forward, as the case may be. It will thus be seen that the mechanism described constitutes manually-controlled engine shifting and locking means, by which the movement of the engine for starting, stopping and reversing the vehicle is readily controlled.

In connection with the apparatus thus far described, I provide a brake moved with the engine-shaft bearings so as to be brought into engagement with the annular braking surface on the traction wheels when the engine is moved to release the tension of the ropes 34 to stop the vehicle. I preferably utilize the space on the rim 33 unoccupied by the rope 34 as this annular braking surface, and provide the brake shoe 56, which has the proper radius of curvature to and curve in cross section to coöperate with the rim. This shoe is secured upon the bar 57, which is pivoted at 58 upon the supporting link 59 pivoted at 60 upon the collar 61 secured upon the end of the engine-supporting frame 25. It is also normally held rigid by the link 62, shown in Fig. 10, which is pivoted at 63 to the same collar 61, and is provided with the cord 64 running over the sheaves 65 and 66 to the arm 67 secured on the rock shaft 68 extending transversely of the bed, and having the pedal lever 69 extending upward into a position where it can be readily operated by the foot when it is desired to back the vehicle, which is the only time this apparatus is called into play. The link 62 has the longitudinal slot 70 therein terminating with the transverse recess, which, engaging with the pivot rod 58, serves to normally lock the brake shoe in position to firmly engage with the rim 33 when the engine is moved to stopping position. If the pedal lever 69 be operated, it will be apparent that the cord 64 running over the sheaves will pull up the lever 62 to the dotted-line position of Fig. 7, and the first effect of this swinging movement of the lever is to unlock the brake as soon as the pin 58 is disengaged from the recess 71, and its continued movement will draw the brake shoe away from the rim 33 in a manner which will be readily apparent. It will be understood that the brake shoe might be otherwise supported, provided it had the same relative movement to the wheels.

While I have herein shown and described the automobile and driving mechanism generally, I do not herein claim the same, as that is fully described and claimed in my said application No. 352,848, of which the present application is a division.

While I have shown and described my invention in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with the traction wheel, of the frame, the engine-shaft movable to and from the traction wheel to stop and start the vehicle, driving connections between the engine-shaft and the traction wheel, an annular braking surface rotating with the traction wheel, and a brake moving with the engine-shaft to engage the annular braking surface as the engine-shaft is moved to stop the vehicle.

2. In a device of the class described, the combination with the traction wheel, of the frame, the engine-shaft movable to and from the traction wheel to stop, start and reverse the vehicle, driving and reversing connections between the engine-shaft and the traction-wheel, an annular braking surface rotating with the traction wheel, a brake moving with the engine-shaft to engage the annular braking surface as the engine-shaft is moved to stop the vehicle, and means for moving the brake away from said annular braking surface when the engine-shaft is moved to reversing position.

3. In a device of the class described, the combination with the traction wheel, of the stationary frame, a secondary movable frame, the engine-shaft journaled in said frame and movable therewith to and from the traction wheel to stop and start the vehicle, driving connections between the engine-shaft and the traction-wheel, an annular braking surface rotating with the traction-wheel, and a brake moving with the movable frame to engage the annular braking surface as the frame is moved to stop the vehicle.

4. In a device of the class described, the combination with the traction wheel, of the stationary frame, the secondary movable frame carried by said stationary frame, the engine-shaft journaled in the secondary frame and movable to and from the traction wheel to stop, start and reverse the vehicle, driving and reversing connections between the engine-shaft and the traction wheel, an annular braking surface rotating with the traction wheel, a brake upon the secondary frame moving therewith to engage the annular braking surface as the frame is moved to stop the vehicle, and means for moving the brake upon the movable frame and away from said annular braking surface when the frame is moved to reversing position.

5. In a device of the class described, the combination with the traction wheel, of the frame, the engine-shaft movable to and from the traction wheel to stop, start and reverse the vehicle, driving and reversing connections between the engine-shaft and the traction-wheel, an annular braking surface rotating with the traction wheel, a brake moving with the engine-shaft to engage the annular braking surface as the engine-shaft is moved to stop the vehicle, and means for moving the brake away from said annular braking surface when the engine-shaft is moved to reversing position, and for releasing the brake to permit it to automatically return to its normal position.

6. In a device of the class described, the combination with the traction wheel, of the stationary frame, a secondary movable frame, the engine-shaft journaled in said frame and movable therewith to and from the traction wheel to stop and start the vehicle, driving connections between the engine-shaft and the traction wheel, an annular braking surface rotating with the traction wheel, and a brake moving with the movable frame to engage the annular braking surface as the frame is moved to stop the vehicle, and for releasing the brake to permit it to automatically return to its normal position.

7. In a device of the class described, the combination with the traction-wheel, of the frame, the engine-shaft movable to and from the traction wheel to stop and start the vehicle, driving connections between the engine-shaft and the traction wheel, comprising a driving-rope pulley on the engine-shaft, a driving rope, and a pulley wheel concentric and rotating with the traction wheel to act as a braking surface and to receive the driving rope, and a brake moving with the engine-shaft to engage the annular braking surface as the engine-shaft is moved to stop the vehicle.

8. In a device of the class described, the combination with the traction-wheel, of the frame, the engine-shaft movable to and from the traction wheel to stop and start the vehicle, driving connections between the engine-shaft and the traction-wheel, comprising a driving-rope pulley on the engine-shaft, an annular rim concentric and rotating with the traction-wheel to act as a braking surface and to receive the driving rope, the driving rope, a reversing disk secured to the engine-shaft in the plane of the traction wheel, a brake moving with the engine-shaft to engage the rim as the engine-shaft is moved to stop the vehicle, and means for moving the brake away from said rim when the engine-shaft is moved to reversing position.

9. In a device of the class described, the combination with the traction wheel, of the frame, the engine-shaft movable to and from the traction wheel to stop and start the vehicle, driving connections between the engine-shaft and the traction-wheel, comprising a driving-rope pulley on the engine-shaft, an annular rim concentric and rotating with the traction wheel to act as a braking surface and to receive the driving rope, the driving rope, a reversing disk secured to the engine-shaft in the plane of the traction wheel, a brake moving with the engine-shaft to engage the rim as the engine-shaft is moved to stop the vehicle, and means for moving the brake away from said rim when the engine-shaft is moved to reversing position, and for releasing the brake to permit it to automatically return to its normal position.

10. In a device of the class described, the combination with the traction wheel, of the frame, the engine-shaft movable to and from the traction wheel to stop and start the vehicle, driving connections between the engine shaft and the traction-wheel, an annular braking surface rotating with the traction wheel, and a brake operated by the movement of the engine shaft to engage the annular braking surface as the engine shaft is moved to stop the vehicle.

11. In a device of the class described, the combination with the traction wheel, of the frame, the engine-shaft movable to and from the traction wheel to stop, start and reverse the vehicle, driving and reversing connections between the engine-shaft and the traction-wheel, an annular braking surface rotating with the traction wheel, a brake moving with the engine-shaft to engage the annular braking surface as the engine-shaft is moved to stop the vehicle, and means for disengaging said brake and said annular braking surface when the engine-shaft is moved to reversing position.

12. In a device of the class described, the combination with the traction wheel, of the stationary frame, a secondary movable frame, the engine-shaft journaled in said frame and movable therewith to and from the traction wheel to stop and start the vehicle, driving connections between the engine-shaft and the traction-wheel, an annular braking surface rotating with the traction-wheel, and a brake operated by the movement of the frame to engage the annular braking surface as the frame is moved to stop the vehicle.

13. In a device of the class described, the combination with the traction wheel, of the frame, the engine-shaft movable to and from the traction wheel to stop and start the vehicle, driving connections between the engine-shaft and the traction-wheel, comprising a driving-rope pulley on the engine-shaft, an annular rim concentric and rotating with the traction-wheel to act as a braking surface and to receive the driving rope, the driving rope, a reversing disk secured to the engine-shaft in the plane of the traction wheel, a brake moving with the engine-shaft to engage the rim as the engine-shaft is moved to stop the vehicle, and means for disengaging said brake and rim when the engine-shaft is moved to reversing position, and for releasing the brake to permit it to automatically return to its normal position.

14. In a motor vehicle, the combination of a frame, a traction wheel mounted on a stationary support and having a sheave thereon, a motor mounted to swing fore and aft on the frame and having a sheave, a friction disk arranged to engage the traction wheel, and a brake arranged to engage the sheave on said traction wheel precedent to the engagement of the friction disk with the wheel, a belt connecting the said sheaves, and means for swinging the motor fore and aft.

15. In a device of the class described, the combination with a traction wheel, of a frame, an engine-shaft movable to and from the traction wheel to stop and start the vehicle, driving connections between the engine-shaft and the traction wheel, an annular braking surface rotating with the traction wheel, and a brake operated by the movement of the engine-shaft to engage the annular braking surface as the engine-shaft is moved to stop the vehicle.

16. In a device of the class described, the combination with a traction wheel, of a frame, a driving shaft movable to and from the traction wheel to stop and start the vehicle, driving connections between the driving shaft and the traction wheel, an annular braking surface rotating with the traction wheel, and a brake operated by the movement of the driving shaft to engage the annular braking surface as the driving shaft is moved to stop the vehicle.

17. In a device of the class described, the combination with a traction wheel, of a frame, a driving shaft movable to and from the traction wheel to stop and start the vehicle, driving connection between the driving shaft and the traction wheel, an annular braking surface rotating with the traction wheel, and a brake moving with the driving shaft to engage the annular braking surface as the driving shaft is moved to stop the vehicle.

18. In a device of the class described, the combination with a traction wheel, of a stationary frame, a secondary movable frame, an engine-shaft journaled in said frame and movable therewith to and from the traction wheel to stop and start the vehicle, driving connections between the engine-shaft and the traction-wheel, an annular braking surface rotating with the traction-wheel, and a brake operated by the movement of the engine-shaft to engage the annular braking surface as the frame is moved to stop the vehicle.

19. In a device of the class described, the combination with a traction wheel, of a stationary frame, a secondary movable frame, a driving shaft journaled in said frame and movable therewith to and from the traction wheel to stop and start the vehicle, driving connections between the driving shaft and the traction-wheel, an annular braking surface rotating with the traction-wheel, and a brake operated by the movement of the driving shaft to engage the annular braking surface as the frame is moved to stop the vehicle.

20. In a device of the class described, the combination with a traction wheel, of a stationary frame, a secondary movable frame, a driving shaft journaled in said frame and movable therewith to and from the traction wheel to stop and start the vehicle, driving connections between the driving shaft and the traction wheel, an annular braking surface rotating with the traction wheel, and a brake moving with the movable frame to engage the annular braking surface as the frame is moved to stop the vehicle.

21. In a device of the class described, the combination with a traction wheel, of a frame, an engine-shaft movable to and from the traction-wheel to stop and start the vehicle, driving connections between the engine-shaft and the traction-wheel comprising a driving-rope pulley on the engine-shaft, an annular rim concentric and rotating with the traction-wheel to act as a braking surface and to receive the driving rope, the driving rope, a reversing disk secured to the engine-shaft in the plane of the traction-wheel, a brake operated by the movement of the engine-shaft to engage the rim as the engine-shaft is moved to stop the vehicle, and means for moving the brake away from said rim when the engine-shaft is moved to reversing position, and for releasing the brake to permit it to automatically return to its normal position.

22. In a device of the class described, the combination with a traction wheel, of a frame, a driving shaft movable to and from the traction wheel to stop and start the vehicle, driving connections between the driving shaft and the traction wheel comprising a driving-rope pulley on the driving shaft, an annular rim concentric and rotating with the traction wheel to act as a braking surface and to receive the driving rope, the driving rope, a reversing disk secured to the driving shaft in the plane of the traction wheel, a brake operated by the movement of the driving shaft to engage the rim as the driving shaft is moved to stop the vehicle, and means for moving the brake away from said rim when the driving shaft is moved to reversing position, and for releasing the brake to permit it to automatically return to its normal position.

23. In a device of the class described, the combination with a traction wheel, of a frame, a driving shaft movable to and from the traction wheel to stop and start the vehicle, driving connections between the driving shaft and the traction wheel comprising a driving-rope pulley on the driving shaft, an annular rim concentric and rotating with the traction wheel to act as a braking surface and to receive the driving rope, the driving rope, a reversing disk secured to the driving shaft in the plane of the traction wheel, a brake moving with the driving shaft to engage the rim as the driving shaft is moved to stop the vehicle, and means for moving the brake away from said rim when the driving shaft is moved to reversing position, and for releasing the brake to permit it to automatically return to its normal position.

In witness whereof, I have hereunto set my hand and affixed my seal, this 30th day of January A. D. 1909.

HENRY K. HOLSMAN. [L. S.]

Witnesses:
C. BEN SHOLES,
JOHN HOWARD McELROY.